(12) United States Patent
Meckler et al.

(10) Patent No.: US 12,456,107 B2
(45) Date of Patent: Oct. 28, 2025

(54) CUSTOMIZABLE MEDIA CONTENT FOR POINT OF SALE (POS) TRANSACTIONS

(71) Applicant: Capital One Services, LLC, McLean, VA (US)

(72) Inventors: Marc Meckler, Richmond, VA (US); Joseph James Ford, III, Manakin Sabot, VA (US); Matthew S. Edwards, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 105 days.

(21) Appl. No.: 18/299,238

(22) Filed: Apr. 12, 2023

(65) Prior Publication Data

US 2024/0346477 A1 Oct. 17, 2024

(51) Int. Cl.
  *G06Q 20/20* (2012.01)
  *G06Q 20/10* (2012.01)
(52) U.S. Cl.
  CPC .......... *G06Q 20/209* (2013.01); *G06Q 20/10* (2013.01)
(58) Field of Classification Search
  None
  See application file for complete search history.

(56) References Cited

U.S. PATENT DOCUMENTS

| | | | |
|---|---|---|---|
| 12,039,511 B2 * | 7/2024 | Pawar | G06Q 20/209 |
| 2013/0191213 A1 * | 7/2013 | Beck | G06Q 30/0207 |
| | | | 705/14.64 |
| 2019/0220832 A1 * | 7/2019 | Itwaru | G06Q 20/0855 |
| 2019/0287093 A1 * | 9/2019 | Perry | G06Q 30/0267 |
| 2021/0279707 A1 * | 9/2021 | Pawar | G06Q 20/209 |
| 2023/0419949 A1 * | 12/2023 | Edwards | G06Q 20/42 |

FOREIGN PATENT DOCUMENTS

| | | | | |
|---|---|---|---|---|
| AU | 2010303906 A1 * | 5/2012 | | G06Q 20/20 |
| CA | 2876615 C * | 10/2018 | | G06Q 40/02 |

* cited by examiner

*Primary Examiner* — Ariel J Yu
(74) *Attorney, Agent, or Firm* — Banner & Witcoff Ltd.

(57) ABSTRACT

Techniques are disclosed for customizing the feedback provided to a user at a point-of-sale (POS) terminal upon completion of an electronic payment transaction. The feedback may include the content of one or more media files that may be customized by a user in response to different conditions being met, and which may be specified as part of a user profile. Additional or alternative feedback may be specified by an entity identified with the user's payment account, such as a bank or creditor, which may comprise additional or alternative media file(s) that may be identified in response to specific predetermined conditions being met upon the electronic payment transaction being initiated. The feedback may be sent to the POS terminal and/or to a different device based upon the type of electronic payment transaction and/or the capabilities of the POS terminal.

20 Claims, 3 Drawing Sheets

CUSTOMIZABLE MEDIA CONTENT FOR POINT OF SALE (POS) TRANSACTIONS

TECHNICAL FIELD

This disclosure generally relates to the implementation of customizable media content that is played at the completion of an electronic payment transaction.

BACKGROUND

Current point-of-sale (POS) terminals are widely used to facilitate electronic payment transactions. Typically, a user interacts with such POS terminals via a contactless payment or by physically swiping, dipping, or tapping a payment card. Upon approval of the electronic payment transaction, the POS terminal may provide a visual and/or audio notification as feedback. However, current electronic payment transaction systems that utilize POS terminals are limited to a single type of audio feedback, which only conveys basic information such as the authorization of the current transaction. Users presently have no flexibility to customize or change this feedback, and thus current electronic payment transaction systems lack the ability to convey customized and detailed feedback.

BRIEF DESCRIPTION OF THE DRAWINGS/FIGURES

The accompanying drawings, which are incorporated herein and form a part of the specification, illustrate the embodiments of the present disclosure and, together with the description, and further serve to explain the principles of the aspects and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

Figure 1:
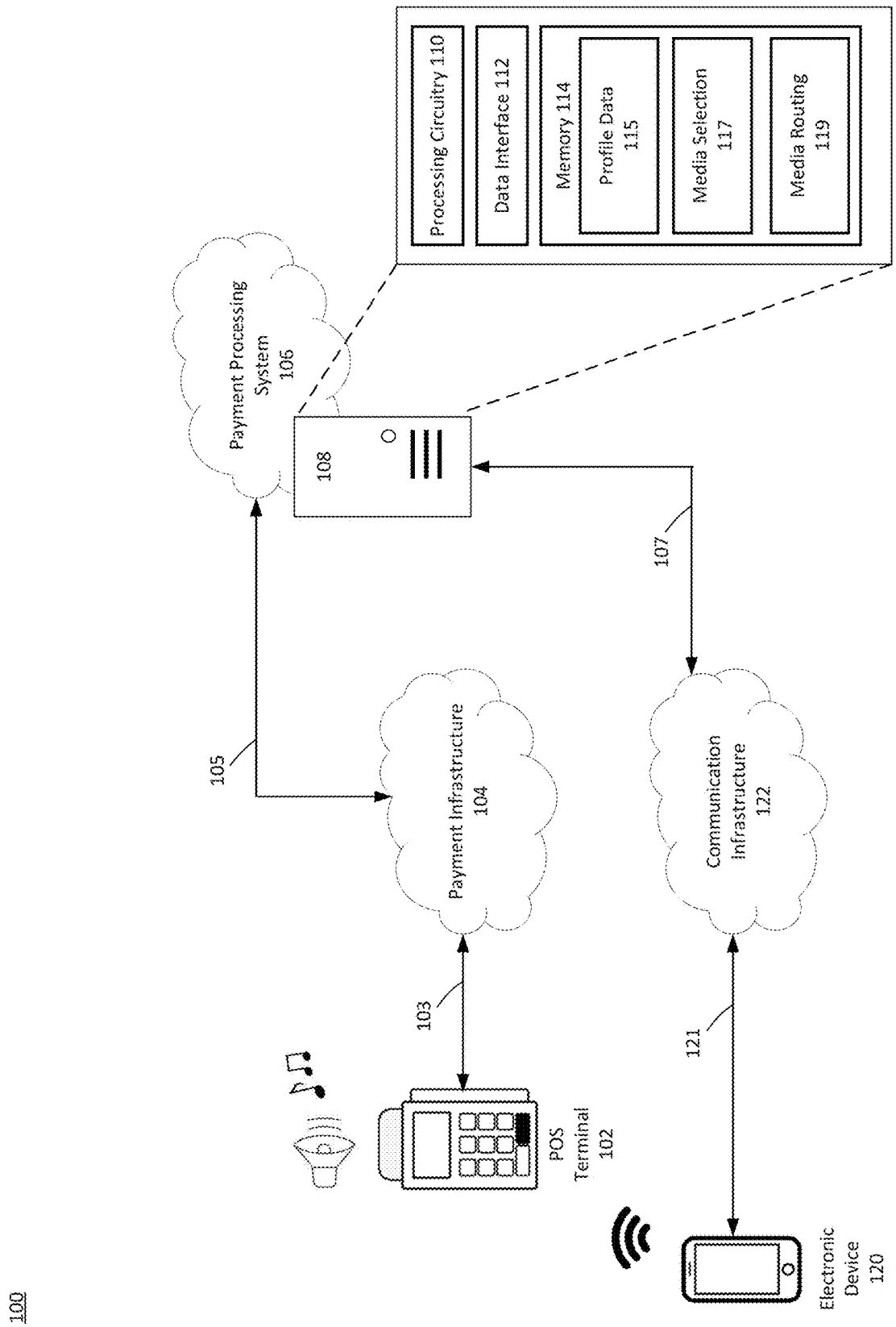
FIG. 1 illustrates an example electronic payment transaction architecture in accordance with one or more embodiments of the disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The embodiments described herein are directed to the customization of feedback that may be provided upon the completion of an electronic payment transaction. The electronic payment transaction may include one that is initiated via a user's interaction with a point-of-sale (POS) terminal, and may include the use of a physical or virtual payment card, the latter including the use of card payment applications or "wallets" that may be installed on a user's mobile device, smartwatch, etc. The feedback may include playing the content of one more media files, which may include audio, images, videos, etc., on the POS terminal or another device, which may be the same device used for interaction with the POS terminal. The feedback, i.e. the choice of which media file content to play, may be selected as part of a "back-end" system or computing device that performs payment processing for electronic payment transactions.

The feedback may thus be selected via the back-end computing devices and transmitted to the POS terminal or another device based upon the application of predetermined rules. The predetermine rules define various conditions that, when met, result in the selection and transmission of the corresponding media file(s) to a target device, and may also include a prioritization scheme. The predetermined rules may form part of one or more profiles, which may be created and modified as desired by the payment card user, the issuing bank identified with the card, or other entities. In this way, the feedback that is played upon the completion of an electronic payment transaction may be customized in response to various defined conditions being met (e.g. transaction amounts, categories of spending, etc.).

The embodiments described herein not only allow for the customization of the feedback itself, but also provide additional flexibility with respect to the target device that should receive the transmitted media file(s) and/or which target device is to play the content identified with the media file(s). In this way, not only may the media file(s) be customized, but the manner in which the media files are transmitted as well as how the media file(s) are transmitted may be customized as well. The embodiments thus provide technical advantages with respect to the improvement of network resource utilization, as various conditions may be established that allow the media file(s) to be transmitted in a manner that adapts to network conditions and/or prevents a worsening of current network conditions.

Furthermore, by controlling the transmission of the media files to the target devices as discussed herein, the POS terminals and other target devices may be prevented from playing feedback unless it is received via a media file(s) transmission. That is, the target devices may not play any feedback unless it is received and/or approved by the back-end computing device as part of the embodiments as further described herein. Thus, the embodiments enable an improvement to power usage and efficiency in the target devices.

Moreover, the embodiments discussed herein advantageously exploit the overhead that is present in the transmission of the authentication data that is transmitted to the target devices as part of an electronic payment transaction authorization process. For instance, the transmitted media file(s) may be included as part of the authentication data transmissions. Doing so does not significantly increase network traffic or reduce the available bandwidth in light of the relatively small size of the media files.

A computer-implemented method is provided. The computer-implemented method comprises receiving, via a point of sale (POS) terminal, transaction data that indicates initiation of an electronic payment transaction associated with a payment card account; identifying, using the transaction data, a user profile, associated with the payment card account, that identifies a media file, wherein the media file comprises audio to be played at the completion of the electronic payment transaction; receiving, from a payment processing system based on the transaction data, an indication of whether the electronic payment transaction was approved; and based on a determination that the electronic payment transaction was approved, causing the audio of the media file to be output by a speaker of the POS terminal. In addition or in alternative to and in any combination with the optional features previously explained in this paragraph, the user profile identifies a plurality of user-specified media files, each one of the plurality of user-specified media files comprising a different respective audio to be played at the completion of the electronic payment transaction, and a predetermined rule that indicates, based upon the transaction data, which one of the plurality of user-specified media files to cause the audio thereof to be output by the speaker of the POS terminal at the completion of the electronic payment transaction. In addition or in alternative to and in any combination with the optional features previously explained in this paragraph, the user profile identifies a plurality of user-specified media files, each one of the user-specified media files corresponding to a different merchant category code (MCC), and causing the audio to be output by the speaker of the POS terminal comprises selecting, based on a MCC associated with the electronic payment transaction, one of the plurality of user-specified media files, the audio thereof to be output by the speaker of the POS terminal at the completion of the electronic payment transaction. In addition or in alternative to and in any combination with the optional features previously explained in this paragraph, the computer-implemented method further comprises identifying, using the transaction data, a predetermined rule based upon the payment card account, the predetermined rule specifying a further media file, the audio thereof to be further output by the speaker of the POS terminal at the completion of the electronic payment transaction when a predefined payment card account condition is met. In addition or in alternative to and in any combination with the optional features previously explained in this paragraph, the predefined payment card account condition comprises a low account balance condition that is met when a balance of the payment card account is less than a threshold monetary value. In addition or in alternative to and in any combination with the optional features previously explained in this paragraph, the predefined payment card account condition comprises an enhanced rewards condition that is met when the electronic payment transaction matches a predefined category of spending. In addition or in alternative to and in any combination with the optional features previously explained in this paragraph, the predefined payment card account condition comprises a merchant category code (MCC) condition that is met when the electronic payment transaction matches a predefined MCC.

An additional computer-implemented method is provided. The computer-implemented method comprises receiving, via a point of sale (POS) terminal, transaction data that indicates initiation of an electronic payment transaction associated with a payment card account; identifying, using the transaction data, a user profile associated with the payment card account, the user profile identifying a plurality of user-specified media files, each one of the plurality of user-specified media files comprising a different respective audio to be played at the completion of the electronic payment transaction; receiving, from a payment processing system based on the transaction data, an indication of whether the electronic payment transaction was approved; and based on a determination that the electronic payment transaction was approved, causing the audio of one of the plurality of user-specified media files to be output by a speaker of the POS terminal. In addition or in alternative to and in any combination with the optional features previously explained in this paragraph, the user profile identifies a predetermined rule that indicates, based upon the transaction data, which one of the plurality of user-specified media files to cause the audio thereof to be output by the speaker of the POS terminal at the completion of the electronic payment transaction. In addition or in alternative to and in any combination with the optional features previously explained in this paragraph, each one of the user-specified media files corresponds to a different merchant category code (MCC), and causing the audio to be output by the speaker of the POS terminal comprises selecting, based on a MCC associated with the electronic payment transaction, one of the plurality of different user-specified media files, the audio thereof to be output by the speaker of the POS terminal at the completion of the electronic payment transaction. In addition or in alternative to and in any combination with the optional features previously explained in this paragraph, the computer-implemented method further comprises identifying, using the transaction data, a predetermined rule based upon the payment card account, the predetermined rule specifying a further media file, the audio thereof to be further output by the speaker of the POS terminal at the completion of the electronic payment transaction when a predefined payment card account condition is met. In addition or in alternative to and in any combination with the optional features previously explained in this paragraph, the predefined payment card account condition comprises a low account balance condition that is met when a balance of the payment card account is less than a threshold monetary value. In addition or in alternative to and in any combination with the optional features previously explained in this paragraph, the predefined payment card account condition comprises an enhanced rewards condition that is met when the electronic payment transaction matches a predefined category of spending. In addition or in alternative to and in any combination with the optional features previously explained in this paragraph, the predefined payment card account condition comprises a merchant category code (MCC) condition that is met when the electronic payment transaction matches a predefined MCC.

A further computer-implemented method is provided. The computer-implemented method comprises receiving via a point of sale (POS) terminal, transaction data that indicates initiation of an electronic payment transaction associated with a payment card account; identifying, using the transaction data, a user profile, associated with the payment card account, that identifies a media file, the user profile identifying a plurality of user-specified media files, each one of the plurality of user-specified media files comprising a different respective audio to be played at the completion of the electronic payment transaction; receiving, from a payment processing system based on the transaction data, an indication of whether the electronic payment transaction was approved; and based on a determination that the electronic payment transaction was approved, selectively causing the audio of one of the plurality of user-specified media files to be output by a speaker of the POS terminal or a speaker of an electronic device that is different from the POS terminal. In addition or in alternative to and in any combination with the optional features previously explained in this paragraph, selectively causing the audio of one of the plurality of user-specified media files to be output by the speaker of the POS terminal or the speaker of the electronic device is based upon a capability of the POS terminal to play the audio of the one of the plurality of user-specified media files. In addition or in alternative to and in any combination with the optional features previously explained in this paragraph, selectively causing the audio of one of the plurality of user-specified media files to be output by the speaker of the POS terminal or the speaker the electronic device is based upon whether the electronic payment transaction comprises a contactless payment between the POS terminal and the electronic device. In addition or in alternative to and in any combination with the optional features previously explained in this paragraph, the user profile identifies a predetermined rule that indicates, based upon the transaction data, which one of the plurality of user-specified media files to cause the audio thereof to be selectively output by the speaker of the POS terminal or the speaker of an electronic device. In addition or in alternative to and in any combination with the optional features previously explained in this paragraph, each one of the user-specified media files corresponds to a different merchant category code (MCC), and causing the audio of one of the plurality of user-specified media files to be selectively output by the speaker of the POS terminal or the speaker of an electronic device output comprises selecting, based on a MCC associated with the electronic payment transaction, one of the plurality of different user-specified media files, the audio thereof to be selectively output by the speaker of the POS terminal or the speaker of an electronic device at the completion of the electronic payment transaction. In addition or in alternative to and in any combination with the optional features previously explained in this paragraph, the computer-implemented method further comprises identifying, using the transaction data, a predetermined rule based upon the payment card account, the predetermined rule specifying a further media file, the audio thereof to be further selectively output by the speaker of the POS terminal or the speaker of an electronic device at the completion of the electronic payment transaction when a predefined payment card account condition is met.

FIG. 1 illustrates an example electronic payment transaction architecture in accordance with one or more embodiments of the present disclosure. The electronic payment transaction architecture 100 (also referred to herein as an architecture 100) includes a point-of-sale (POS) terminal 102, which may be associated with and used by any suitable entity that may accept electronic payments from a user. For example, the POS terminal 102 may be identified with a merchant, which is used to accept electronic payment transactions. Thus, the POS terminal 102 may be implemented as any suitable type of electronic device that facilitates any suitable number and/or type of such electronic payment transactions, which may include debit card transactions, credit card transactions, charge card transactions, or any other suitable type of electronic payment transaction in which monetary assets are to be exchanged. Thus, the POS terminal 102 may comprise hardware components, software components, or combinations of these to facilitate the receipt of payment card details to initiate an electronic payment transaction. To provide some illustrative examples, the POS terminal 102 may comprise components implemented for contact-based payments such as card chip readers, magnetic stripe readers, etc., and may additionally or alternatively comprise components implemented for contactless payments such as near-field communication (NFC) circuitry, radio-frequency identification (RFID) circuitry, wireless communication circuitry, etc.

Contact-based payments may be implemented via the POS terminal 102 receiving payment card details via a chip or magnetic stripe integrated with the user's physical payment card. Contactless payments, on the other hand, may be implemented by receiving payment card details and/or exchanging data with a user's physical payment card and/or via communications with an electronic device 120, as further discussed herein. Thus, the electronic device 120 may be implemented as any suitable device configured to support electronic payment transactions. The electronic device 120 may include one or more applications ("apps") such as digital wallets that may enable the electronic device 120 to communicate with the POS terminal 102 to facilitate a contactless electronic payment transaction. For example, the electronic device 120 may be implemented as a mobile phone, a tablet, a wearable computing device such as a smart watch, etc.

Regardless of the type of electronic payment transaction that is performed, the POS terminal 102 may also comprise hardware components configured to provide feedback to a user upon the approval or denial of such electronic payment transactions, which may be initiated by a user via a payment card. For example, the POS terminal 102 may include one or more speakers and/or displays that are configured to play audio, display images, display videos, etc., to inform a user of an approved or denied electronic payment transaction. Additionally or alternatively, when contactless payments are initiated via the electronic device 120, the one or more speakers and/or displays of the electronic device 120 may likewise provide audio and/or visual feedback.

However, and as noted above, conventional electronic payment transaction architectures utilize one type of feedback for all transactions types, and thus only provide users with a limited amount of feedback for each transaction. The embodiments as discussed herein expand upon this functionality by enabling a user or other entity (e.g. an issuing bank of the user's payment card) to customize the feedback presented to a user (e.g. via the POS terminal 102 and/or the electronic device 120). This customization may be, for example, in response to various conditions being met upon the initiation of an electronic payment transaction associated with a user's payment card account.

To do so, the architecture 100 includes a payment infrastructure 104, which is coupled to the POS terminal 102 via any suitable number and/or type of communication links 103. The payment infrastructure 104 may be identified with an aggregation of the infrastructure used to convey transaction data between the POS terminal 102 and a payment processing system 106, which then authorizes or declines the electronic payment transaction. The payment infrastructure 104 may comprise a payment gateway and/or the infrastructure associated with one or more card networks. For example, the payment infrastructure 104 may include any suitable number of card networks, each being identified with a respective card scheme such as VISA, MASTERCARD, AMERICAN EXPRESS, DISCOVER, etc. The payment infrastructure 104 may comprise any suitable number of wired connections, wireless connections, networks, computing devices, etc., that receive the transaction data from the POS terminal 102 upon the initiation of an electronic payment transaction associated with a payment card account. The payment infrastructure 104 may thus be communicatively coupled to the POS terminal 102 via the communication links 103, which represent any suitable number of wired and/or wireless links to support data communications in accordance with any suitable number and/or type of communication protocols.

The payment infrastructure 104 may function to secure (e.g. via encryption, encoding, etc.) the transaction data received via the POS terminal 102, which is then transmitted to the payment processing system 106 as shown in FIG. 1.

Thus, the payment processing system 106 is also communicatively coupled to the payment infrastructure 104 via any suitable number of communication links 105, which represent any suitable number of wired and/or wireless links to support data communications in accordance with any suitable number and/or type communication protocols. Although illustrated in FIG. 1 as a separate entity, the payment processing system 106 may be integrated as part of the payment infrastructure 104. In this scenario, the functionality of the payment infrastructure 104 and the payment processing system 106 as discussed herein are performed by a single aggregated infrastructure that enables communications between the POS terminal 102 and the issuing bank computing device 108.

The payment processing system 106 may comprise one or more payment processors and any suitable number of wired connections, wireless connections, networks, computing devices, etc., that receive the transaction data from the payment infrastructure 104 and determine whether an electronic payment transaction identified with the transaction data should be approved or denied. The issuing bank computing device 108 may be identified with a financial institution that issued the user's payment card, which may be associated with the received transaction data and the corresponding electronic payment transaction. Thus, the payment processing system 106 may function to connect merchants with the financial institutions to authorize transactions and to facilitate the transfer of funds. In some embodiments, the issuing bank computing device 108 may form part of the payment processing system 106 (or alternatively, part of the payment infrastructure 104 in the event that the payment infrastructure 104 and the payment processing system 106 comprise a single entity as noted above). Thus, the issuing bank computing device 108 may be communicatively coupled to the payment processing system 106 via any suitable number and/or type of wireless and/or wired communication links (not shown) to receive the indication of whether the electronic payment transaction is approved or denied. Alternatively, as part of the payment processing system 106, the issuing bank computing device 108 may make the determination of whether the electronic payment transaction is approved or denied.

Thus, the issuing bank computing device 108 may indicate or receive an indication from the payment processing system 106 regarding whether the electronic payment transaction is approved or denied, with this decision being made based on the transaction data. To allow this decision to be made, the transaction data may comprise any suitable type of information that is received by the payment processing system 106 and is related to the initiation of the electronic payment transaction. Again, the transaction data may be communicated by the POS terminal 102 to the payment processing system 106 via the payment infrastructure 104, and may be encrypted and/or encoded to protect the contents thereof. For instance, the transaction data may include any suitable details identifying the user and/or the user's payment card account such as a user's name, address, account number, the card verification value (CVV), etc.

To provide additional examples, the transaction data may additionally or alternatively comprise details identified with the electronic payment transaction such as a transaction amount, a merchant ID and/or a merchant category code (MCC), a location code, a merchant address, etc. To provide further examples, the transaction data may additionally or alternatively comprise details identified with the POS terminal 102, which may include authentication data that enables the payment infrastructure 104 to authenticate the POS terminal 102 as a valid device, a serial number and/or model number of the POS terminal 102, technical capabilities and/or specifications of the POS terminal 102, a type of electronic payment transaction (e.g. via chip, swipe, a contactless payment with a physical card, a contactless payment between the POS terminal 102 and the electronic device 120, etc.), etc.

Again, the issuing bank computing device 108 may form part of and/or be communicatively coupled to the payment processing system 106, which is configured to approve or deny electronic payment transactions. The processing of electronic payment transactions may be performed in accordance with any suitable techniques, including known techniques. However, the embodiments as further described herein are directed to the use of predetermined rules to enable customized feedback to be presented by the POS terminal 102, the electronic device 120, and/or other devices.

A block diagram of the issuing bank computing device 108 is shown in FIG. 1, which is configured to perform the various embodiments described herein. Thus, the issuing bank computing device 108 is configured to receive, via the POS terminal 102 as noted above, the transaction data, which indicates an initiation of an electronic payment transaction associated with a payment card account at the POS terminal 102. The issuing bank computing device 108 then utilizes the transaction data to identify a user profile that is associated with the payment card account for the electronic payment transaction. As will be discussed in further detail below, the user profile includes information that identifies one or more media files, which comprise content (e.g. audio, images, video, etc.) that are to be played at a target device upon the completion of the electronic payment transaction.

For example, the content may be played (i.e. output by a speaker) at the POS terminal 102 or, in alternate embodiments as discussed in further detail below, via the electronic device 120. The user profile may include one or more corresponding conditions that, when met, result in the selection of the respective media file identified with that condition and the corresponding content to be played on the target device. Therefore, and as noted above, the issuing bank computing device 108 may receive, via the payment processing system 106, an indication of whether the electronic payment transaction was approved based upon the transaction data. In the event that the electronic payment transaction is approved, the issuing bank computing device 108 may transmit one or more media files (or a portion thereof) to a target device in accordance with one or more predetermined rule(s), which are further discussed below. The target device may include e.g. the POS terminal 102, the electronic device 120, or another device (not shown), causing the content of each media file (e.g. audio, an image, a video, etc.) to be played by an output device (e.g. a speaker, display, etc.) of the target device, as the case may be. Optionally, in the event that the electronic payment transaction is denied, the issuing bank computing device 108 may alternatively transmit one or more media files (or a portion thereof) to the target device in accordance with the predetermined rule(s).

Thus, when transmitting the one or more media file(s) to the POS terminal 102 as the target device, the issuing bank computing device 108 may utilize the communication links 105 to transmit the media file(s) via the payment infrastructure 104, which then transmits the media file(s) to the POS terminal 102 via the communication links 103. Advantageously, these media file(s) may be transmitted as part of the authorization data that is transmitted to the POS terminal 102 to indicate the authorization or denial of the electronic payment transaction. In other words, each electronic payment transaction via the POS terminal 102 may be authorized by the payment processing system 106, which typically responds with a binary response (i.e. approve/deny) and thus does not constitute a significant amount of data.

For instance, the media files and/or the other authorization data (e.g. the yes/no authorization decision) that is transmitted to the POS terminal 102 may be encrypted. However, because the media files do not contain sensitive or personal information, the media files and/or the other authorization data need not be encrypted for transmission to the POS terminal 102, in contrast with the transaction data that is received by the payment processing system 106. Thus, the media files may be transmitted in unencrypted form to further reduce their size during transmission. Another option to further reduce the size of the media files may include storing and/or transmitting the media files in a compressed format using any suitable file compression scheme. In such a scenario, the target device may decompress the media files using any suitable decompression scheme to play the contents thereof.

As an example, the stored and transmitted media files may comprise two-channel audio content snippets of a few seconds (e.g. 3-7 seconds) and thus have a size on the order of several hundred kilobytes (e.g. between 500 kB-950 kB). As a result, the media files may be transmitted as part of the authentication data, which may include a transmission within the same data payload (e.g. the same data packet), as additional data payloads that constitute part of the same authentication transmission, or as successive data transmissions. The media files may thus supplement the authentication data that is sent back to the POS terminal 102 in response to each electronic payment transaction and, given their limited size, do not cause network latency or significantly decrease the speed at which electronic payment transactions are performed.

Again, the target device may alternatively include the electronic device 120. In such a case, it is noted that the architecture 100 may optionally comprise a communication infrastructure 122, which enables communications between the electronic device 120 and the issuing bank computing device 108. Thus, the communication infrastructure 122 may comprise any suitable number of wireless and/or wired networks, interconnections, cellular base stations, access points, routers, wireless nodes, etc., that may facilitate a data connection between the electronic device 120 and the issuing bank computing device 108. The communication infrastructure 122 may thus be communicatively coupled to the electronic device 120 and to the issuing bank computing device 108 via the communication links 121 and 107, respectively, which represent any suitable number of wired and/or wireless links to support data communications in accordance with any suitable number and/or type of communication protocols.

As noted above, the transaction data that is received by the issuing bank computing device 108 may indicate the capabilities of the POS terminal 102 (e.g. via a model number or serial number that may be referenced). The transaction data may also indicate the specific type of contact-based or contactless payment used to initiate the electronic payment transaction via the POS terminal 102. In an embodiment, based on a determination that the electronic payment transaction was approved (e.g. the payment processing system 106 indicating that the electronic payment transaction is approved or denied), the issuing bank computing device 108 may determine, from a predetermined rule as discussed further below, which target device should be the recipient of the media file(s). Thus, and as further discussed below, in some embodiments the predetermined rule may be used only when the transaction is approved, whereas in other embodiments the predetermined rule may be used when the transaction is approved as well as when it is denied. In other words, the issuing bank computing device 108 may selectively cause the POS terminal 102, the electronic device 120, or another suitable device (not shown) to play the content of the media file(s) based upon which target device is a recipient of the transmitted media file(s).

In various embodiments, the media files may be transmitted to a target device to cause the device to play the content of the transmitted media files upon completion of the electronic payment transaction. For instance, the media files may be transmitted to the POS terminal 102 via the payment infrastructure 104, resulting in the POS terminal 102 playing the content of the media file(s). As another example, the media files may be transmitted to the electronic device 120 via the communication infrastructure 122. Alternatively, the media files may be transmitted to the POS terminal 102, and then transmitted by the POS terminal 102 to the electronic device 120 at the completion of the electronic payment transaction. Such communications may implement, for example, NFC or other suitable communication links (e.g. Wi-Fi direct, Bluetooth, etc.) between the POS terminal 102 and the electronic device 120, which may be the same communication link used to initiate the electronic payment transaction by the electronic device 120 or a different communication link.

The determination of which target device should play the content of the media file, as well as how the media files should be transmitted to the target device, may be made based upon any suitable conditions, which may be specified as part of one or more predetermined rule(s) or determined via other suitable means, as further discussed herein. For example, the conditions may include the capability of the POS terminal 102 to play the content of the one of the plurality of user-specified media files. As another example, the conditions may include whether the electronic payment transaction comprises a contactless payment between the POS terminal 102 and the electronic device 120, which may be determined from the transaction data as noted above. To provide further examples, the transaction data may indicate that the POS terminal 102 has limited output capabilities such as a single speaker, utilizes single channel (mono) audio, does not have a speaker, has a display that is not full color and/or a resolution that is less than a predefined threshold, etc.

Moreover, the issuing bank computing device 108 may utilize the information contained in any of the predetermine rules as discussed herein to additionally or alternatively identify the parameters associated with the transmission of the media files to the target device. Such parameters may identify, for instance, if and how the media files are compressed, encoded, and/or encrypted, the networks to be used for transmission, the particular communication protocols to utilize for transmission, etc. For instance, the issuing bank computing device 108 may format the media file(s) or utilize a specific encryption, encoding, compression, etc. for transmission based upon the configuration and/or limitations of the POS terminal 102.

As an example, the issuing bank computing device 108 may transmit a compressed media file when the POS terminal 102 has sufficient memory and/or processing power to handle the decompression (which may meet predefined relevant thresholds), and otherwise transmit the media files to the POS terminal 102 as uncompressed files. As another example, the issuing bank computing device 108 may format and/or encode the media files based upon the configuration of the POS terminal 102, e.g. the ability of the POS terminal 102 to recognize, decode, etc., the media files that are to be played. The issuing bank computing device 108 may further consider other conditions identified with the communication links and/or networks used for the transmission of media files to the POS terminal 102. For example, the issuing bank computing device 108 may compress the media file(s) for transmission in circumstances in which network conditions are poor (e.g. a high latency, low bandwidth, low network speeds, etc., which may be identified via a comparison to respective applicable network metrics).

In the event that the media file(s) are to be transmitted to the electronic device 120 via the communication infrastructure 122, it is noted that the authorization data is still transmitted to the POS terminal 102, but in this case the media file(s) are separately transmitted to the electronic device 120. Thus, when the communication infrastructure 122 is utilized for this purpose, the transmission of the media file(s) to the electronic device 120 may be performed in accordance with any suitable techniques that cause the electronic device 120 to play the content of the media file(s), such as a push notification for instance. Such embodiments advantageously provide further flexibility in how the content is presented (which may be adapted to a variety of different types of electronic devices) while reducing network traffic through the payment infrastructure 104.

To facilitate the embodiments as discussed herein, the issuing bank computing device 108 may be identified with any suitable type of standalone computing device such as a desktop computer, a laptop, a server computer, a tablet computer, a mobile device, or components thereof. Additionally or alternatively, the issuing bank computing device 108 may be identified with any suitable number of computing devices and/or computing systems, which may form part of the payment processing system 106, the payment infrastructure 104, or other computing devices, systems, and/or networks not shown in the Figures. Thus, the issuing bank computing device 108 (or other suitable computing device, system, etc., as the case may be) may be implemented as and/or include a networked, cloud-based, and/or other suitable architecture that enables the computing devices, systems, etc. thereof to communicate with one another and/or to work in conjunction with one another.

The issuing bank computing device 108 may be coupled to and/or be a part of the payment processing system 106, as noted above. The issuing bank computing device 108 may include processing circuitry 110, a data interface 112, and a memory 114. The components of the issuing bank computing device 108 as shown in FIG. 1 are provided for ease of explanation, and the issuing bank computing device 108 may implement additional, less, or alternative components as those shown in FIG. 1. Furthermore, although the embodiments are discussed herein with respect to the issuing bank computing device 108 storing, accessing, and/or executing data and/or instructions with respect to the memory 114, the data and/or instructions may additionally or alternatively be stored, accessed, and or executed from any suitable storage device, which may be integrated as part of or separate from the issuing bank computing device 108 (e.g. networked storage, cloud storage, etc.) to perform any of the embodiments as discussed herein.

The processing circuitry 110 may be configured as any suitable number and/or type of computer processors, which may function to control the issuing bank computing device 108 and/or other components of the issuing bank computing device 108. The processing circuitry 110 may be identified with one or more processors (or suitable portions thereof) implemented by the issuing bank computing device 108. The processing circuitry 110 may be identified with one or more processors such as a host processor, a digital signal processor, one or more microprocessors, graphics processors, a graphics processing unit (GPU), baseband processors, microcontrollers, an application-specific integrated circuit (ASIC), part (or the entirety of) a field-programmable gate array (FPGA), etc.

The processing circuitry 110 may be configured to carry out instructions to perform arithmetical, logical, and/or input/output (I/O) operations, and/or to control the operation of one or more components of the issuing bank computing device 108 to perform the various functions as described herein. The processing circuitry 110 may include one or more microprocessor cores, memory registers, buffers, clocks, etc., and may generate electronic control signals associated with the components of the issuing bank computing device 108 to control and/or modify the operation of these components. The processing circuitry 110 may communicate with and/or control functions associated with the data interface 112 and/or the memory 114. The processing circuitry 110 may be configured as any suitable number and/or type of components configured to facilitate the issuing bank computing device 108 performing the various functions as discussed herein and as shown in the accompanying Figures.

The data interface 112 may be implemented as any suitable number and/or type of components that function to enable issuing bank computing device 108 to interface with additional devices, and may implement for instance buses, ports, drivers, adapters, etc. The data interface 112 may form part of an overall communication circuitry implemented by the issuing bank computing device 108, which may communicate with other computing devices as discussed herein to receive and/or transmit data. For instance, the data interface 112 may enable the issuing bank computing device 108 to receive the transaction data associated with an electronic payment transaction from the POS terminal 102, to receive an indication of the electronic payment transaction being approved or denied from the payment processing system 106, to transmit the selected media files(s) to a target device, etc.

The memory 114 is configured to store data and/or instructions such that, when are executed by the processing circuitry 110, cause the issuing bank computing device 108 to perform various functions as described herein. The memory 114 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 114 may be non-removable, removable, or a combination of both. The memory 114 may be implemented as a non-transitory computer readable medium storing one or more executable instructions such as, for example, logic, algorithms, code, etc.

As further discussed below, the instructions, logic, code, etc., stored in the memory 114 are represented by the various components as shown in FIG. 1, which may enable the various functions of the aspects as described herein to be functionally realized. Alternatively, if implemented via hardware, the memory components as shown in FIG. 1 may include instructions and/or code to facilitate control and/or monitor the operation of such hardware components. In other words, the memory components as shown in FIG. 1 are provided for case of explanation regarding the functional association between hardware and software components. Thus, the processing circuitry 110 may execute the instructions stored in these respective memory components in conjunction with one or more hardware components to perform the various functions as discussed herein.

The profile data module 115 may include instructions that, when executed via the processing circuitry 110, enable the generation, storage, and/or access of various profiles. These profiles may include, for example, the user profiles and the account profiles as discussed herein with reference to the predetermined rules and conditions that allow for the selection of specific media file(s) for each electronic payment transaction. The profile data module 115 may include the stored data identified with these profiles in embodiments in which the profile data is stored on the issuing bank computing device 108 or, alternatively, enable this data to be accessed when stored on a separate computing device (e.g. within the payment processing system 106).

With respect to the user profiles, it is noted that the issuing bank identified with the issuing bank computing device 108 may have a large number of users (e.g. several thousand or several million). Each user may be identified with a unique user profile, which again may be stored or otherwise accessed by the issuing bank computing device 108. A user may create a user profile as part of an initial enrollment and/or onboarding process with the issuing bank, during which time the user may be prompted to create a unique username and password to access their account. This may occur, for example, via the use of the electronic device 120 or any other suitable computing device. In accordance with an embodiment, once the initial user profile is created, a user may access their account to specify (e.g. via any suitable user interface) any suitable number of media files that may contain content, as well as a predetermined rule that specifies the conditions to be met and the prioritization for each media file to be selected based upon the details of a particular electronic payment transaction.

For example, a user profile may identify one or more user-specified media files as shown in Table 1 below.

TABLE 1

| User ID: User_ABC_1976 | Conditions and Prioritization |
|---|---|
| Media File 1 | Default |
| Media File 2 | Transactions Exceeding $500 |
| Media File 3 | MCCs 3500-3999 |
| Media File 4 | MCC 5018 |
| Media File 5 | MCC 3000 |
| Media File 6 | Transaction denied |
| . | |
| . | |
| . | |
| Media File N | . . . |

The user-specified media files may be selected by a user from a group of media files that are provided by the issuing bank, e.g. as part of a curated and pre-approved list. This may be particularly useful to avoid copyright issues and/or to promote artists with which the issuing bank may have an existing relationship, license, promotional interest, etc. Alternatively, a user may upload a custom user-specified media file to the issuing bank computing device 108, which may be subjected to an approval process. Again, these media files may include, for instance, content such as song and/or audio snippets, images, and/or video snippets. The media files may be of any suitable size and be stored in accordance with any suitable format, although it may be advantageous to have a maximum media file size to not adversely impact network traffic over the payment infrastructure 104 and/or the payment processing system 106.

Moreover, a maximum media file size may be established such that the authorization data may be sent within a desired threshold time period to prevent undesired delays of electronic payment transaction processing. In some scenarios, some (or all) of the content of the user-specified media files may be different than one another, i.e. each corresponding to different content to be played in response to the corresponding conditions being met. In other scenarios, the content of some of the user-specified media files may be the same as one another, such that the same content is played in response to the corresponding conditions being met. The information shown in Table 1 above may be stored in the issuing bank computing device 108 (e.g. in the memory 114 as the profile data 115) or stored in a separate computing device that is accessed by the issuing bank computing device 108.

Thus, the user profile represents, via the various conditions and/or defined prioritizations, a predetermined rule. The predetermined rule may be generated with the assistance of the issuing bank computing device 108. For example, via execution of the instructions stored in the profile data 115, the issuing bank computing device 108 may present (via a suitable computing device) a user interface with prompts regarding preferences, choices among preselected conditions, and an order of priority for the media files to be played in the event that more than one condition is met and each condition corresponds to a different media file. For instance, the default condition may be met upon an electronic payment transaction being approved, such that the content of the default media file 1 may be played on a target device upon the completion of the electronic payment transaction. In the event that the electronic payment transaction is denied, the content of the media file 6 may be played on the target device upon the completion of the electronic payment transaction.

As another example, the ordered listing of the media files in Table 1 may indicate a preferred prioritization of electronic payment transactions that are approved. Thus, only the content of media file 2 may be played even though the condition corresponding to selection of the content of the media file 3 is also met. In other embodiments, the content of each media file may be successively played and/or a maximum number may be specified. It is noted that although the term "predetermined" is used herein with respect to the rules used to specify the content of each media file(s) to be played for a particular electronic payment transaction, this is with respect to the time the electronic payment transaction is initiated. Any of the predetermined rules as discussed herein may be modified (e.g. by the user and/or the issuing bank) at any time based upon further desired customizations.

To enable the selection of the media file(s) form be selected and transmitted to a target device, the media selection module 117 may include instructions that, when executed via the processing circuitry 110, enable the selection of one or more media files in accordance with the predetermined rule specified by the user profile. For example, and referring now back to Table 1, the conditions as shown include a default user-specified media file selection, a user-specified media file selection for transactions that exceed a threshold monetary value, as well as several user-specified media files corresponding to a different merchant category code (MCC) (or a range of MCC codes).

Thus, to provide an illustrative example, upon receiving transaction data identified with an electronic payment transaction, the issuing bank computing device 108 may identify a user from the transaction data, which may then be used to correlate the electronic payment transaction to a specific user ID and a corresponding user profile. Upon receiving an indication that the electronic payment transaction is approved or denied via the payment processing system 106, the issuing bank computing device 108 may reference the user profile to determine which media file(s) to transmit to a target device. The transmitted media file(s), once received at the target device, cause the target device to play the content of the media file at the completion of the electronic payment transaction. In this way, a user may specify various conditions that, when met, result in specific content being played via a specific target device. Thus, a user could specify that a range of MCC codes corresponding to airline purchases result in a target device playing an audio snippet of "Space Oddity" by Chris Hadfield. As another illustrative example, a user could specify that, for all denied transactions, a target device would play an audio snippet of the quote "Game Over Man!" from Private Hudson in the movie "Aliens."

However, it is noted that these conditions are provided by way of example and not limitation. In fact, the predetermined rule identified with each user profile may specify any suitable number and/or type of conditions, each corresponding to a different media file. For example, other conditions not shown in Table 1 could include location-based conditions and/or retailer-specific conditions. As additional examples, other conditions could include a maximum gratuity add-on percentage threshold to make a user aware if an excessive tip was added as part of an electronic payment transaction.

In addition to or instead of the predetermined rules discussed above with respect to the user profiles, the embodiments described herein may utilize predetermined rules that are based upon other information. For example, the issuing bank may define one or more additional or alternative predetermined rules that identify other media files and corresponding conditions that, when met, result in the POS terminal 102 and/or the electronic device 120 playing the corresponding content upon completion of the electronic payment transaction. Such rules may be referred to herein with respect to "account profiles," which may include one or more conditions that are specified by an entity other than the user. Like the user-specified media files noted above, the additional or alternate media files specified by the account profiles may also include content such as song and/or audio snippets, images, and/or video snippets. Moreover, the account profiles as discussed herein may also identify a prioritization scheme, maximum media file size thresholds, a maximum number of media files to be selected, target devices, etc.

Thus, embodiments include the issuing bank or other suitable entity generating an account profile that, similar to the user profile, defines a predetermined rule based upon the payment card account and/or user identified with the electronic payment transaction. It is noted that although the predetermined rules are specified in accordance with the user profile and account profile separately, this is for ease of explanation. The embodiments as described herein may utilize a single profile that defines a single predetermined rule and includes all relevant conditions, as well as a prioritization scheme, for the identification of media files to be played upon the completion of each electronic payment transaction.

However, in such a scenario it is noted that the user may have the ability to create and edit the conditions and prioritization scheme identified with the user profile as described herein, whereas the issuing bank or other entity may have the ability to create and edit the conditions and prioritization scheme identified with the account profile. Thus, for the account profile, the conditions may comprise predefined payment card account conditions that are defined by an issuing bank or other entity in addition to or instead of those that may be identified by the user profile. In this way, the issuing bank may advantageously use these predefined payment card account conditions to promote branding, play advertisements, provide feedback to a user regarding current promotions or enhanced rewards bonuses, etc.

For example, an account profile may identify one or more media files that are specified by the issuing bank or other non-user entity, as shown in Table 2 below. As was noted for the user profile information, the account profile information as shown in Table 2 below may likewise be stored in the issuing bank computing device 108 (e.g. in the memory 114 as the profile data 115) or stored in a separate computing device that is accessed by the issuing bank computing device 108.

TABLE 2

| User ID: User_ABC_1976 Account Type: Credit Rewards Gold | Conditions and Prioritization |
|---|---|
| Media File 1 | Default |
| Media File 2 | Low Account Balance/ High Credit Usage |
| Media File 3 | MCCs 3500-3999 |
| Media File 4 | MCC 5018 |
| Media File 5 | Rewards Bonus |
| Media File 6 | Sponsored Event/Retailer |
| Media File 7 | Transaction denied |
| . . . | |
| Media File N | . . . |

In various embodiments, the media file(s) that are transmitted to the target device may be selected based upon the predetermined rules specified by the user profile, the account profile, or both. For instance, a condition of the predetermined rule identified with the user profile as shown in Table 1 and the account profile as shown in Table 2 may both be met upon an electronic payment transaction being approved or denied. To provide an illustrative example, when an electronic payment is approved, the default conditions of each predetermined rule may be met such that content of the user-specified media file 1 from Table 1 and the content of media file 1 of Table 2 may be played in succession on the POS terminal 102 at the completion of the electronic payment transaction.

As noted above for the user profiles, to facilitate the selection of the media to be transmitted to a target device, the media selection module 117 may include instructions that, when executed via the processing circuitry 110, enable the selection of one or more media files in accordance with the predetermined rule specified by the account profile. For example, and referring now back to Table 2, the predefined payment card conditions as shown include a default media file selection, a media file selection for transactions that result in a low account balance (e.g. for debit cards) or a high credit usage (e.g. for credit cards), which may be identified with a threshold monetary value in each case. Additional predefined payment card conditions include a merchant category code (MCC) condition that is met when an electronic payment transaction matches a predefined MCC. Still further, another predefined payment card condition includes an enhanced rewards condition that is met when an electronic payment transaction matches a predefined category of spending. As yet another example as shown in Table 2, another predefined payment card condition includes a sponsored event and/or a retailer condition that is met when an electronic payment transaction matches a predefined location, retailer, and/or known transaction ID. Such a condition may be particularly useful to allow for the content of a media file to be played when an electronic payment transaction is performed at an event that the issuing bank may be sponsoring.

Thus, to provide an illustrative example, upon receiving transaction data identified with an electronic payment transaction, the issuing bank computing device 108 may identify a user from the transaction data, which may then be used to correlate the electronic payment transaction to a specific user ID and corresponding user profile. Upon receiving an indication that the electronic payment transaction is approved or denied via the payment processing system 106, the issuing bank computing device 108 may reference the user profile, and determine which user-specified media file (s) to transmit back to the target device to cause that target device to output the content of the media file at the completion of the electronic payment transaction. Additionally, the issuing bank computing device 108 may identify, from the user ID and/or the transaction data, an account profile that matches the type of account (e.g. Credit Rewards Gold as shown in Table 2) used for the current electronic payment transaction. The issuing bank computing device 108 may then further reference the account profile to determine which additional media file(s) to transmit back to the target device to cause the target device to play the content of the media file(s) at the completion of the electronic payment transaction.

In this way, the user and the issuing bank may specify various conditions that, when met, result in specific content being played via a target device. Thus, continuing the previous example in which the POS terminal 102 played an audio snippet of "Space Oddity" by Chris Hadfield, this electronic payment transaction could also correspond to an enhanced rewards condition being met (e.g. for airline travel). In this case, an additional audio snippet may be played at the POS terminal 102 that may be specified by the issuing bank.

As noted above, it is noted that the predefined payment card account conditions as shown and discussed herein with respect to Table 2 are provided by way of example and not limitation. Again, the predetermined rules identified with the account profiles may specify any suitable number and/or type of predefined payment card account conditions, each corresponding to a different media file. For example, other conditions not shown in Table 2 could include location-based conditions.

Moreover, although referred to herein as "payment card account conditions," this is for case of explanation to differentiate these conditions from user-based conditions as noted above. In accordance with various embodiments, the account profile may include predetermined rules that may be based upon other conditions, which may consider the specific user and/or the specific payment card for that user, as well as alternate conditions. To provide an illustrative example, the payment card account conditions may be defined by the issuing bank or other suitable entity for users and/or cards that are not currently identified with the issuing bank. For instance, the issuing bank may provide specific rules per POS terminal such that the authentication data, or portions thereof, may be received by the issuing bank computing device 108 even in instances in which the electronic payment transaction is associated with a different issuing bank. Thus, the payment card account conditions in such a case may result in the selection and transmission of a media file to the POS terminal 102, which may comprise content of an advertisement of the issuing bank. Such payment card account conditions may be particularly advantageous to enhance market branding, as the payment card account conditions may specify parameters identified with a negative user experience with a competitor's payment card (e.g. multiple transaction attempts, a declined transaction, etc.).

The media routing module 119 may include instructions that, when executed via the processing circuitry 110, enable the determination of a target device for the transmission of one or more media files in accordance with the predetermined rule specified by the user profile and/or the account profile, as discussed above. For example, the instructions included in the media routing module 119 may cause, when executed by the processing circuitry 110, the issuing bank computing device 108 to determine whether one or more predetermined conditions are met. These conditions may include, for instance, a capability of the POS terminal to play the content of the selected media files. For example, if the transaction data indicates that the POS terminal 102 lacks a speaker, then the issuing bank computing device 108 may alternatively transmit the media file(s) to the electronic device 120, regardless of whether the electronic device 120 was used as part of the electronic payment transaction. That is, the issuing bank computing device 108 may access the user profile to determine a recipient (e.g. a phone number) to transmit the media files (e.g. as a push notification) when the POS terminal 102 is incapable of doing so.

As another example, if the transaction data indicates that the electronic payment transaction comprises a contactless payment between the POS terminal 102 and the electronic device 120, then the issuing bank computing device 108 may transmit the media file(s) to the electronic device 120 instead of the POS terminal 102. The one or more predetermined conditions that indicate how the media files should be routed between the POS terminal 102, the electronic device 120, or another device may be included as part of the user profile, the account profile, or as separate conditions that are specified via the instructions included in the media routing module 119.

Figure 2:
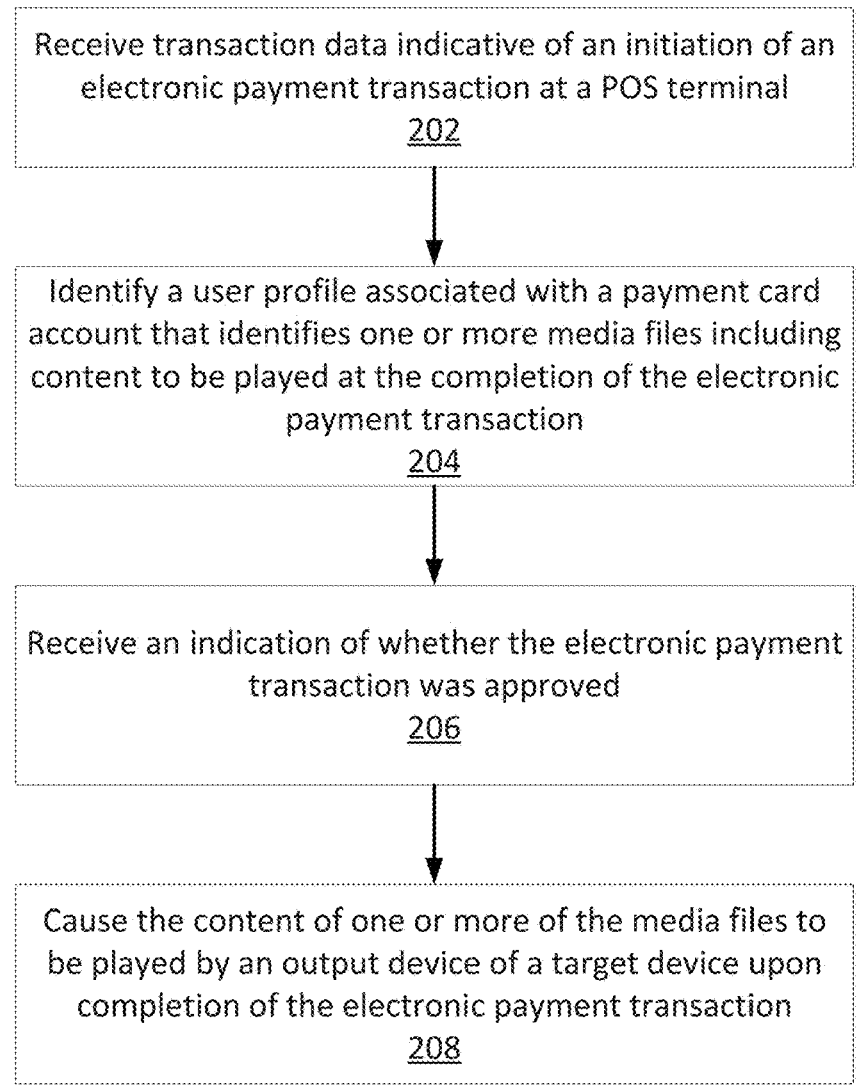
FIG. 2 illustrates a first example process flow, in accordance with one or more embodiments of the disclosure.

FIG. 2 illustrates an example process flow, in accordance with one or more embodiments of the disclosure. The process flow 200 are illustrative, and may include alternate or additional steps that are not shown in FIG. 2 for purposes of brevity, and may be performed in a different order than the steps shown in FIG. 2. e.g. re-arranged, omitted, and/or re-configured as desired. For example, although the process flow 200 is discussed in terms of the application of predetermined rules associated with a user profile, the process flow 200 may also apply to the use of other profiles to cause a target device to play the content thereof, such as the account profiles as discussed herein for instance. Thus, a computing device may be provided that comprises one or more processors and memory storing instructions that, when executed by the one or more processors, cause the performance of any of the steps of FIG. 2. Moreover, one or more non-transitory computer-readable media may be provided storing instructions that, when executed, cause the performance of any of the steps of FIG. 2. As noted herein, the computing device may comprise, for example, the issuing bank computing device 108, whereas the non-transitory computer-readable media may comprise, for instance, the memory 114 of the issuing bank computing device 108.

With reference to FIG. 2, the process flow 200 may be a computer-implemented method executed by and/or otherwise associated with one or more processors (processing circuitry) and/or the execution of instructions stored in any suitable memory and/or storage devices. The functionality associated with the process flow 200 as discussed herein may be performed, for instance, via any suitable computing device and/or processing circuitry, which may be identified with a standalone computing device and/or computing system. Additionally or alternatively, the functionality associated with the process flow 200 may be performed, for example, via any suitable number of computing devices and/or computing systems, which may include networked, cloud-based, or any suitable architecture of computing devices that enables the computing devices to communicate with one another and/or to work in conjunction with one another. In an embodiment, the computing device and/or computing system may be identified with the issuing bank computing device 108 as shown and described herein with respect to FIG. 1.

The process flow 200 may begin by receiving (block 202) transaction data that indicates the initiation of an electronic payment transaction associated with a payment card account. The transaction data may be received, for example, via a point of sale (POS) terminal, such as the POS terminal 102 as discussed herein. The transaction data may comprise any suitable type of information that is received by a payment processing system (e.g. the payment processing system 106) and is related to the initiation of an electronic payment transaction.

The process flow 200 may further comprise identifying (block 204) a user profile associated with a payment card account. The user profile may include or otherwise be identified with one or more media files including content (e.g. audio) to be played at the completion of the electronic payment transaction. Again, the user profile may be identified using the transaction data, and may indicate a predetermined rule that includes corresponding conditions and a prioritization with respect to which media file(s) should be selected and transmitted upon completion of the electronic payment transaction.

The process flow 200 may further comprise receiving (block 206) an indication of whether the electronic payment transaction was approved. This may include, for example, the issuing bank computing device 108 receiving an indication from the payment processing system 106 regarding whether the electronic payment transaction is approved or denied.

The process flow 200 may further comprise causing (block 208) the content (e.g. audio) of one or more media files to be played by a target device upon completion of the electronic payment transaction. Thus, the content of the media file(s) may be played when the electronic payment transaction is approved or denied, as discussed herein. This may include, for example, the selection and transmission of one or more media files associated with the conditions as specified by the predetermined rule identified by the user profile, as discussed herein. This may further include, for example, upon transmitting the one or more media files to the target device (e.g. the POS terminal 102, the electronic device 120, etc.), the target device playing, via an output device (e.g. via a speaker, screen, etc.) the content associated with the media file(s) upon completion of the electronic payment transaction.

Figure 3:
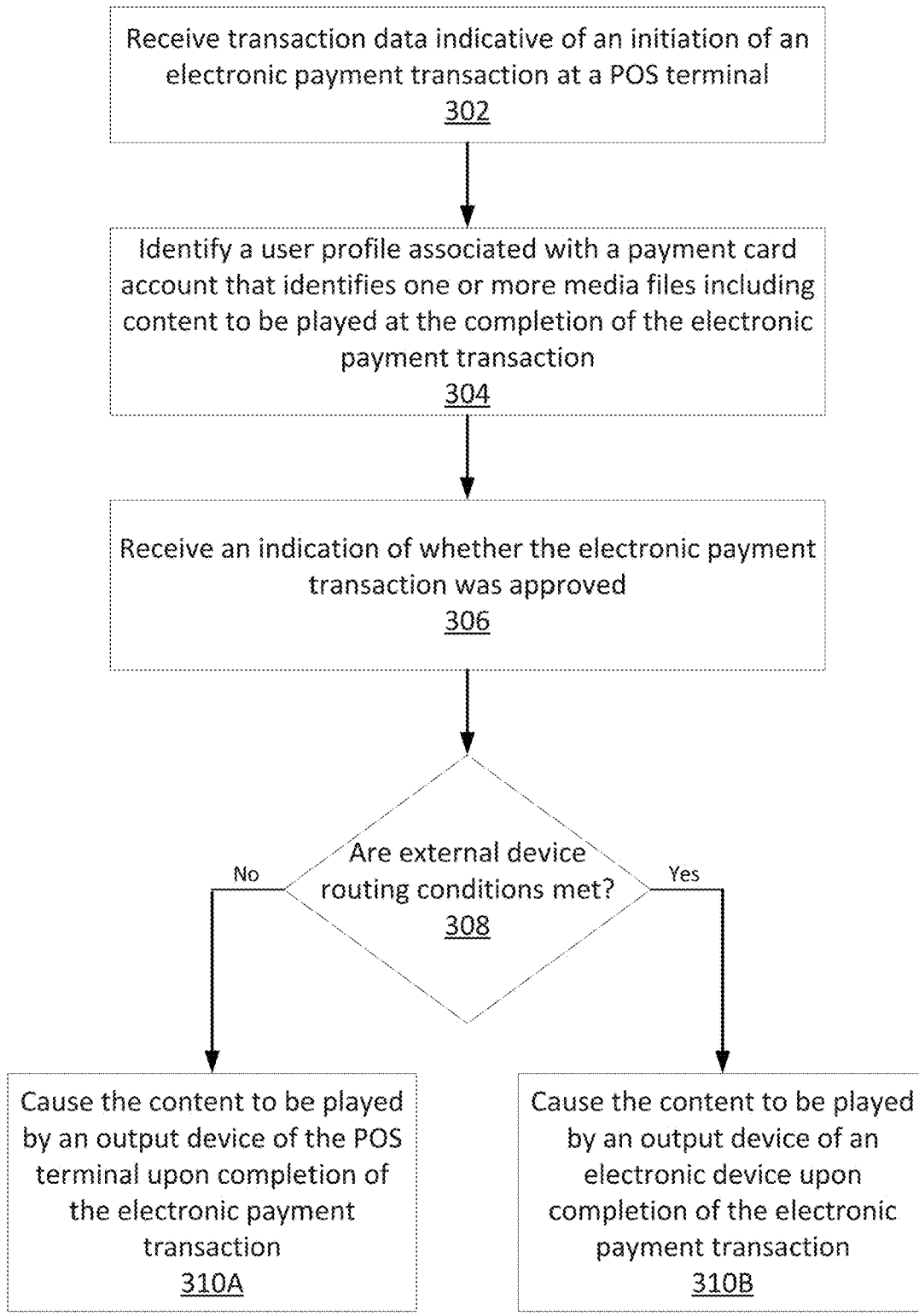
FIG. 3 illustrates a second example process flow, in accordance with one or more embodiments of the disclosure.

FIG. 3 illustrates an example process flow, in accordance with one or more embodiments of the disclosure. The process flow 300 are illustrative, and may include alternate or additional steps that are not shown in FIG. 3 for purposes of brevity, and may be performed in a different order than the steps shown in FIG. 3, e.g. re-arranged, omitted, and/or re-configured as desired. For example, and as noted above for the process flow 200, although the process flow 300 is discussed in terms of the application of a predetermined rule associated with a user profile, the process flow 300 may also apply to the use of other profiles, such as the account profiles as discussed herein for instance. Thus, a computing device may be provided that comprises one or more processors and memory storing instructions that, when executed by the one or more processors, cause the performance of any of the steps of FIG. 3. Moreover, one or more non-transitory computer-readable media may be provided storing instructions that, when executed, cause the performance of any of the steps of FIG. 3. As noted herein, the computing device may comprise, for example, the issuing bank computing device 108, whereas the non-transitory computer-readable media may comprise, for instance, the memory 114 of the issuing bank computing device 108.

With reference to FIG. 3, the process flow 300 may be a computer-implemented method executed by and/or otherwise associated with one or more processors (processing circuitry) and/or the execution of instructions stored in any suitable memory and/or storage devices. The functionality associated with the process flow 300 as discussed herein may be performed, for instance, via any suitable computing device and/or processing circuitry, which may be identified with a standalone computing device and/or computing system. Additionally or alternatively, the functionality associated with the process flow 300 may be performed, for example, via any suitable number of computing devices and/or computing systems, which may include networked, cloud-based, or any suitable architecture of computing devices that enables the computing devices to communicate with one another and/or to work in conjunction with one another. In an embodiment, the computing device and/or computing system may be identified with the issuing bank computing device 108 as shown and described herein with respect to FIG. 1.

The processes identified with blocks 302, 304, and 306 are identical to those identified in blocks 202, 204, and 206, respectively, with respect to the process flow 200 of FIG. 2. Therefore, these processes are not further described herein for purposes of brevity.

The process flow 300 further comprises a determination (block 308) of whether external routing conditions are met. These external routing conditions may include, for instance, any of the conditions descried above that may be used to identify the target recipient of the transmitted media files to a device other than the POS terminal used to initiate the electronic payment transaction. For example, these routing conditions may be part of the computer-readable instructions stored in the media routing module 119 or, alternatively, be defined as part of the conditions associated with a user profile, an account profile, etc. Again, such conditions may include the capability of the POS terminal to play the content of the media file(s) that are to be transmitted, the use of a contactless payment between the POS terminal and an electronic device, etc.

When the external routing conditions are not met, the process flow 300 may include causing (block 310A) the content of the media file(s) to be played via an output device (e.g. a speaker, display, etc.) of the POS terminal used to initiate the electronic payment transaction (e.g. the POS terminal 102) upon completion of the electronic payment transaction. However, when the external routing conditions are met, the process flow 300 may include causing (block 310B) the content of the media file(s) to be played via an output device (e.g. a speaker, display, etc.) of the electronic device (e.g. the electronic device 120 or another device) upon completion of the electronic payment transaction. The mode used for transmission of the media file(s), as well as the target device, may be defined in accordance with the predetermined rule of the user profile or account profile, as part of the computer-readable instructions stored in the media routing module 119, etc. Thus, the content of the media file(s) may be played on the target device upon completion of the electronic payment transaction when the electronic payment transaction is approved or denied, as discussed herein.

It is further noted that although the embodiments are discussed herein with respect to the transmission of media files and playing the contents thereof, this is by way of example and not lithiation. The embodiments as described herein may be expanded such that the conditions of any of the predetermined rules discussed herein may additionally or alternatively correspond to the execution of any suitable type of action or event. For instance, encoded instructions for various actions may replace the media files corresponding to the various conditions as noted above. Thus, instead of selecting and transmitting a media file upon a condition being met, the issuing bank computing device 108 may select and transmit these encoded instructions, which may have a format that is recognized by a target device to which the instructions are transmitted. In this way, the encoded instructions may cause any suitable type of action to be performed by the device that is receiving them. Such actions may include flashing or blinking lights, changing the color of lights, etc. The target devices in such scenarios may include the aforementioned POS terminal 102, the electronic device 120, or other suitable devices (not shown), which may comprise Internet-of-things (IoT) connected devices or other suitable devices. Such devices may be communicatively coupled to the POS terminal 102, the electronic device 120, the payment infrastructure 104, and/or the communication infrastructure 122 to facilitate this functionality.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect.

Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general-purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computer-implemented method, comprising:
   receiving, by a user via a user interface that lists a plurality of different media files, a selection of a first media file comprising audio to be played at a completion of one or more electronic payment transactions;
   storing, in a user profile associated with a payment card account, an association between the first media file and one or more transaction types, wherein the user profile comprises a user-customized rule that indicates that the audio of the first media file is to be played at the completion of an electronic payment transaction, of the one or more electronic payment transactions, corresponding to the one or more transaction types;

receiving, via a point of sale (POS) terminal, transaction data that indicates initiation of the electronic payment transaction associated with the payment card account;

identifying, using the transaction data, the user profile;

receiving, from a payment processing system based on the transaction data, an indication of whether the electronic payment transaction was approved; and based on a determination that the electronic payment transaction was approved and based on the user-customized rule, causing the audio of the first media file to be output by a speaker of the POS terminal.

2. The computer-implemented method of claim 1, wherein the user profile identifies a plurality of user-specified media files, each one of the plurality of user-specified media files comprising a different respective audio to be played at the completion of the electronic payment transaction, and wherein the user-customized rule that indicates, based upon the transaction data, which one of the plurality of user-specified media files to cause the audio thereof to be output by the speaker of the POS terminal at the completion of the electronic payment transaction.

3. The computer-implemented method of claim 1, wherein the user profile identifies a plurality of user-specified media files, each one of the user-specified media files corresponding to a different merchant category code (MCC), and wherein causing the audio to be output by the speaker of the POS terminal comprises selecting, based on a MCC associated with the electronic payment transaction, one of the plurality of user-specified media files, the audio thereof to be output by the speaker of the POS terminal at the completion of the electronic payment transaction.

4. The computer-implemented method of claim 1, further comprising:

identifying, using the transaction data, the user-customized rule based upon the payment card account, the user-customized rule specifying a second media file, the audio thereof to be further output by the speaker of the POS terminal at the completion of the electronic payment transaction when a predefined payment card account condition is met.

5. The computer-implemented method of claim 4, wherein the predefined payment card account condition comprises a low account balance condition that is met when a balance of the payment card account is less than a threshold monetary value.

6. The computer-implemented method of claim 4, wherein the predefined payment card account condition comprises an enhanced rewards condition that is met when the electronic payment transaction matches a predefined category of spending.

7. The computer-implemented method of claim 4, wherein the predefined payment card account condition comprises a merchant category code (MCC) condition that is met when the electronic payment transaction matches a predefined MCC.

8. A computer-implemented method, comprising:

receiving, by a user via a user interface that lists a plurality of different user-specified media files, a selection of a first user-specified media file comprising audio to be played at a completion of one or more electronic payment transactions;

storing, in a user profile associated with a payment card account, an association between the first user-specified media file and one or more transaction types, wherein the user profile comprises a user-customized rule that indicates, for each one of the plurality of user-specified media files, a different respective audio to be played at the completion of an electronic payment transaction, of the one or more electronic payment transactions, corresponding to the one or more transaction types;

receiving, via a point of sale (POS) terminal, transaction data that indicates initiation of the electronic payment transaction associated with the payment card account;

identifying, using the transaction data, the user profile;

receiving, from a payment processing system based on the transaction data, an indication of whether the electronic payment transaction was approved; and based on a determination that the electronic payment transaction was approved and based on the user-customized rule, causing the audio of the first user-specified media file to be output by a speaker of the POS terminal.

9. The computer-implemented method of claim 8, wherein the user profile identifies the user-customized rule that indicates, based upon the transaction data, which one of the plurality of user-specified media files to cause the audio thereof to be output by the speaker of the POS terminal at the completion of the electronic payment transaction.

10. The computer-implemented method of claim 8, wherein each one of the user-specified media files corresponds to a different merchant category code (MCC), and wherein causing the audio to be output by the speaker of the POS terminal comprises selecting, based on a MCC associated with the electronic payment transaction, one of the plurality of user-specified media files, the audio thereof to be output by the speaker of the POS terminal at the completion of the electronic payment transaction.

11. The computer-implemented method of claim 8, further comprising:

identifying, using the transaction data, the user-customized rule based upon the payment card account, the user-customized rule specifying a second user-specified media file, the audio thereof to be further output by the speaker of the POS terminal at the completion of the electronic payment transaction when a predefined payment card account condition is met.

12. The computer-implemented method of claim 11, wherein the predefined payment card account condition comprises a low account balance condition that is met when a balance of the payment card account is less than a threshold monetary value.

13. The computer-implemented method of claim 11, wherein the predefined payment card account condition comprises an enhanced rewards condition that is met when the electronic payment transaction matches a predefined category of spending.

14. The computer-implemented method of claim 11, wherein the predefined payment card account condition comprises a merchant category code (MCC) condition that is met when the electronic payment transaction matches a predefined MCC.

15. A computer-implemented method, comprising:

receiving, by a user via a user interface that lists a plurality of different user-specified media files, a selection of a first user-specified media file comprising audio to be played at a completion of one or more electronic payment transactions;

storing, in a user profile associated with a payment card account, an association between the first user-specified media file and one or more transaction types, wherein the user profile comprises a user-customized rule that indicates, for each one of the plurality of user-specified media files, a different respective audio to be played at the completion of an electronic payment transaction, of the one or more electronic payment transactions, corresponding to the one or more transaction types;

receiving, via a point of sale (POS) terminal, transaction data that indicates initiation of the electronic payment transaction associated with the payment card account;

identifying, using the transaction data, a user profile, associated with the payment card account, the user profile;

receiving, from a payment processing system based on the transaction data and based on the user-customized rule, an indication of whether the electronic payment transaction was approved; and based on a determination that the electronic payment transaction was approved, selectively causing the audio of the first user-specified media file to be output by a speaker of the POS terminal or a speaker of an electronic device that is different from the POS terminal.

16. The computer-implemented method of claim 15, wherein selectively causing the audio of the first user-specified media file to be output by the speaker of the POS terminal or the speaker of the electronic device is based upon a capability of the POS terminal to play the audio of the one of the plurality of user-specified media files.

17. The computer-implemented method of claim 15, wherein selectively causing the audio of the first user-specified media file to be output by the speaker of the POS terminal or the speaker of the electronic device is based upon whether the electronic payment transaction comprises a contactless payment between the POS terminal and the electronic device.

18. The computer-implemented method of claim 15, wherein the user profile identifies the user-customized rule that indicates, based upon the transaction data, which one of the plurality of user-specified media files to cause the audio thereof to be selectively output by the speaker of the POS terminal or the speaker of the electronic device.

19. The computer-implemented method of claim 15, wherein each one of the user-specified media files corresponds to a different merchant category code (MCC), and wherein causing the audio of the first user-specified media file to be selectively output by the speaker of the POS terminal or the speaker of the electronic device output comprises selecting, based on a MCC associated with the electronic payment transaction, one of the plurality of user-specified media files, the audio thereof to be selectively output by the speaker of the POS terminal or the speaker of the electronic device at the completion of the electronic payment transaction.

20. The computer-implemented method of claim 15, further comprising:

identifying, using the transaction data, the user-customized rule based upon the payment card account, wherein the user-customized rule specifies a second user-specified media file, the audio thereof to be further selectively output by the speaker of the POS terminal or the speaker of the electronic device at the completion of the electronic payment transaction when a predefined payment card account condition is met.

* * * * *